(12) United States Patent
Knight (10) Patent No.: US 8,682,970 B2
(45) Date of Patent: Mar. 25, 2014

(54) COMMUNICATIONS DEVICE USER INTERFACE

(75) Inventor: John Knight, Newbury (GB)

(73) Assignee: Vodafone Intellectual Property Licensing Limited, Newbury, Berkshire (GB)

(*) Notice: Subject to any disclaimer, the term of this patent is extended or adjusted under 35 U.S.C. 154(b) by 348 days.

(21) Appl. No.: 12/655,072

(22) Filed: Dec. 22, 2009

(65) Prior Publication Data

US 2010/0191836 A1    Jul. 29, 2010

(30) Foreign Application Priority Data

Dec. 24, 2008  (GB) .................................. 0823452.8

(51) Int. Cl.
*G06F 15/16* (2006.01)
*H04L 29/06* (2006.01)
*H04B 1/06* (2006.01)

(52) U.S. Cl.
USPC ........... 709/204; 709/220; 713/154; 455/26.1

(58) Field of Classification Search
USPC ................... 709/204, 220; 713/154; 455/26.1
See application file for complete search history.

(56) References Cited

U.S. PATENT DOCUMENTS

| | | | | |
|---|---|---|---|---|
| 5,592,540 | A * | 1/1997 | Beveridge | 379/184 |
| 7,606,860 | B2 * | 10/2009 | Puthenkulam et al. | 709/204 |
| 2007/0121843 | A1 * | 5/2007 | Atazky et al. | 379/114.13 |
| 2008/0274694 | A1 * | 11/2008 | Castell et al. | 455/26.1 |
| 2009/0013386 | A1 * | 1/2009 | Puthenkulam et al. | 726/4 |
| 2009/0030985 | A1 * | 1/2009 | Yuan | 709/204 |
| 2009/0124198 | A1 * | 5/2009 | Huynh | 455/26.1 |
| 2010/0131385 | A1 * | 5/2010 | Harrang et al. | 705/26 |
| 2010/0159879 | A1 * | 6/2010 | Salkini et al. | 455/411 |
| 2010/0228826 | A1 * | 9/2010 | Marlow et al. | 709/204 |

FOREIGN PATENT DOCUMENTS

EP    1 988 695 A1 *  5/2007  ............. H04M 3/42

OTHER PUBLICATIONS

Anatoliy A. Gruzd, "Web APIs: A Step towards Greater Mobility of User-Created Data across Social Networking Websites and Their Implications for Research in Information Behavior," SIG USE 2007 Research Symposium, Mobility and Social Networks in Information Behavior, Oct. 20, 2007, 1 p.

* cited by examiner

*Primary Examiner* — Asghar Bilgrami
(74) *Attorney, Agent, or Firm* — Muirhead and Saturnelli, LLC (57) ABSTRACT

In a communications network including a plurality of communication channels through which communications are configured to be transmitted between a plurality of network users, a method of managing communications to be transmitted to a particular user from the plurality of communication channels and/or network users, the method including: receiving a communication from a particular communication channel or another network user, the communication intended for transmission to a particular user; determining whether or not to transmit the communication to the particular user, based upon whether or not the communication satisfies one or more predefined characteristics relating to the particular communication channel and/or the other network user; and transmitting the communication to the particular user when the communication satisfies the predefined characteristics.

15 Claims, 4 Drawing Sheets

COMMUNICATIONS DEVICE USER INTERFACE

FIELD OF THE INVENTION

The present invention relates to a means for and a method of configuring a communications device to make use of services. Further, the present invention relates to a network element, such as a server or combination of servers, configured to aggregate communications intended for a communication device, where the communications relate to a plurality of services. In particular the present invention relates to the aggregation of communications particularly notifications from a plurality of service providers/service accounts. Even more particularly the communication device is a mobile communications device.

BACKGROUND

Mobile devices are increasingly becoming the entry point for a disparate range of communication services. This has particularly become the situation since the Internet became a further mechanism for channelling communication services. That is, in addition to the POTS infrastructure and the mobile communication network infrastructure, the Internet has become an additional configuration that supports communications products and services. In this regard examples of communication products supported by the Internet include "blogs", RSS feeds, widgets, websites and particularly social networking sites. Communication services that can be directly served over the Internet include voice calls, SMS, MMS, video calls, email and IP communications in general.

Therefore, with mobile devices now serving as both communication devices on traditional networks and as entry points for Internet communications products and services, users are faced with a proliferation in the number of communication channels. Indeed it is plausible that as the number of channels of communication increase, the number of contacts and traffic will also increase as a person's communication network expands. This is because, the increase in communication channels exposes users to a greater number of other users (including individual persons and entities such as companies and groups of people) which accordingly results in a corresponding quantitative increase in the number of actual communications. Indeed, many of the Internet-based community communications services are valued because they increase the number of contacts a user has.

However, while opening up available communication channels has facilitated the widening of social circles and fostering of communities, such an open networks, it unfortunately has also resulted in users falling prey to unsolicited communications, whether of a pernicious or just annoying in nature.

This quantitative increase in communications from a wider range of other users is often intrusive and compromises users' control of who contacts them and when. In particular, a common area of irritation often relates to notifications including changes in status of communications, events or even website updates, rather than the communications themselves. In this regard, where a user subscribes to a particular service, such as a social networking site, the service is likely to send notifications of any changes. As well as notifying changes of status, notifications are also received by the user, such as when one of their contacts posts them a message, or invites them to an event, or a topical page they are a member of is updated.

In this regard, notifications distract the user, since they require the user to view them before going into the background or require the user to respond by replying. For example, emails are often received as notifications first in the user's line of sight or on a homepage, and the user has to act on these notifications to dismiss them either by reading them, deleting or performing some other action. More specifically, social networking sites send notifications of changes through a communication channel such as email and/or SMS and again this requires the user to act or at minimum to be distracted even though the communication may be unsolicited and from an unwanted source.

Managing this increase in communication across various channels is not a trivial task or one that will go away. Furthermore, as these channels are most often technically different with separate user interfaces, the user is generally required to move between the different communications channels to view them and monitor communications e.g. email, SMS and/or MMS. This may also require the user to use different devices or navigate between distinctly different parts, such as where proprietary client software is required to operate the communication channel on a device. For instance, a user may be able to manage their Jaiku™ account on PC and their mobile terminal, due to having the Jaiku™ client application installed on their mobile terminal, but only be able to manage their Facebook™ page on PC due to their mobile not having a compatible client application. Similarly, they may only be able to view emails from different service providers on their PC and SMS/MMSs on their mobile phone. Therefore, managing the notifications is thus a real need both now and in the future.

Social Network Aggregators have been proposed, such as Profilefly (www.profilefly.com) and Power.com, which combine information and communications from different social networking sites into a single URL address. These aggregators serve to concentrate communications in the one location, but do not address the problem of an increase in communication traffic, particularly notifications, that are generated from such social networking sites. Unfortunately, the viral nature of communications means that aggregation in itself only ensures a single point of entry for all communications without providing management or control. However, while aggregating social networks makes it easier for the user to receive notifications and content but does not address the problem that these networks have the potential to increase traffic beyond what the user has expected and also is able to manage.

Furthermore, mobile communication devices, by their nature, are particularly predisposed to receiving a multitude of communications/notifications from various sources, so there is a need to manage these communications/notifications on user interfaces (UIs) of such mobile communication devices. In particular there is a need to manage both communications that the mobile devices receive from its standard communication networks, as well as from the Internet.

The present invention therefore seeks to overcome and/or ameliorate at least one of the problems of the prior art.

SUMMARY OF THE INVENTION

According to one aspect, the present invention provides in a communications network including a plurality of communication channels through which communications are configured to be transmitted between a plurality of network users, a method of managing communications to be transmitted to a particular user from the plurality of communication channels and/or other network users, the method including: receiving a communication from a particular communication channel or network user, the communication intended for transmission to the particular user; determining whether or not to transmit the communication to the particular user, based upon whether or not the communication satisfies one or more predefined characteristics relating to the particular communication channel and/or network user; and transmitting the communication to the particular user when the communication satisfies the predefined characteristics.

Preferably the plurality of communication channels include service providers such as internet communication service providers and mobile network communication service providers. In this regard, it is preferable that the communication channels are implemented as network servers.

Preferably the determination step includes a comparison of the particular communication channel, service provider and/or network user with a filter list associated with the particular user, the filter list defining acceptable or unacceptable characteristics for each of the plurality of communication channels, service providers and/or network users.

It is also preferable that the determination step includes a comparison of one or more predefined characteristics including at least one of: the type of communication channel from which the communication was received, an identity of the service provider/communication channel, an identity of the sending network user and a timing schedule for communications to be transmitted to the particular receiving user.

Even more preferably when a particular communication is determined as allowable, the determination step may further include determining one or more communication devices associated with the particular user to which the particular communication is to be sent. For instance, it may be specified that where the communication channel is an SMS and from an acceptable network user, the communication is to be transmitted to a mobile terminal associated with the particular user.

Other aspects of the invention are defined in the claims.

In this regard, these aspects of the invention enable a controlling mechanism to be provided which is able to aggregate and filter communications, including notifications from a plurality of different communication channels such as email, SMS and MMS service providers, from both the Internet and a communication device's network, as applicable. For instance, by placing a network element for aggregating and filtering between the communication channels and one or more user communication devices, these communications are able to be filtered and managed based upon the type of communication channel as well from the identity of the sender, either as an individual contact or a service provider.

The expression "communications" is to be considered to encompass networked data communicated directly between two or more devices and also communications between devices that is passed through a server. Notifications are a form of communication and include the signalling of new communications and changes of status sent to the device directly or indirectly and/or server and encompass notifications that are summaries of communications sent and received and changes of status communicated to the server and/or recipients' devices. Notifications therefore are able to effectively give access to the full communication data or information and are typically redundant once the user has viewed or acted upon them.

Knowing that users are keen to manage their communications by keeping them separate and that the most intrusive element of communications is often notifications rather than the communication itself, this invention aims to simplify managing notifications, typically in conjunction with other communications, and enable users to control them across channels so that they are only notified when they want to be, only by people they want to be and in a manner they are comfortable with.

In particular, these aspects of the invention facilitate the control of notifications on communication channels provisioned to a mobile device. The communication channels are aggregated, and the user is provisioned with the ability to define which channels/service providers they wish to receive notifications from, from which contacts they wish to receive notifications from and the parameters of the actual notifications, such as frequency levels and types of information.

Furthermore, it is preferable that an address book on the user's communication device, be it a computer or a mobile phone, is utilised in defining the strategy regarding which communications are received, when they are received and from whom. Separate rules may also be defined for undefined senders that are not part of the user's address book. This enables all communications and notifications to be managed together, which allows them to be received when the user wants them, whether the sender is part of the address book on the device or separate to it. This gives the user greater control of the communications, and provides a central point of access and control. Lastly, this also allows the user to prioritise important information and people.

These aspects of the invention can be based on a server or combination of servers that communicate with the different communication channels in order to aggregate notifications and other communications being sent to a particular user. These channels include ones serviced by a mobile device's network and cabling and secondary ones that are facilitated by a third party server including ones accessible on the Internet, such as social networking sites.

In this way, in this particular embodiment, rather than blocking certain communications, as per the known junk mail filters, the user instead is able to manage messages received from certain sources, based on entries in their phone book.

BRIEF DESCRIPTION OF THE DRAWINGS

For a better understanding of the present invention, an embodiment will now be described with reference to the accompanying drawings, in which.

DETAILED DESCRIPTION

In the drawings like elements are generally designated with the same reference sign.

Figure 1:
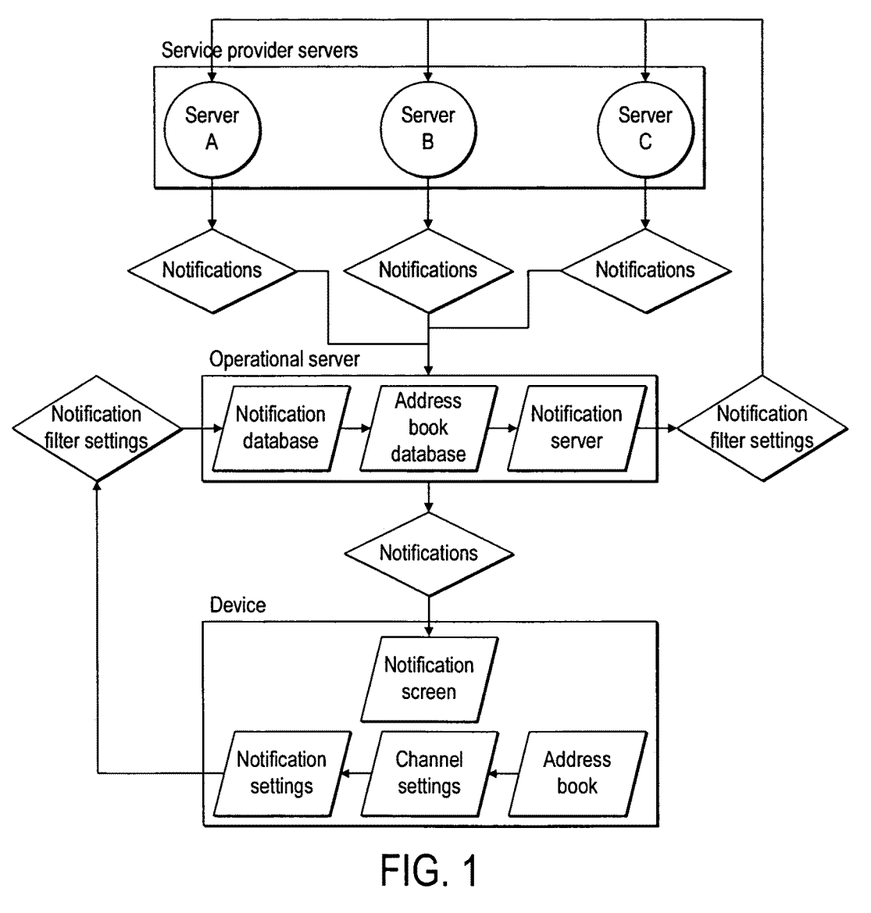
FIG. 1 shows schematically the elements of a telecommunications network according to an embodiment of the present invention.

A user's mobile terminal 1 is registered with mobile or cellular telecommunications network. Via this network, in accordance with a feature of this first embodiment of the invention, the mobile terminal 1 is in communication with an Operator Server 2. This operator server may be a single server or a combination of servers. The operator server may also be within, or controlled by the mobile telecommunications network or even on the communications terminal itself. It is preferable that the server 2 is provided in the network as this would improve network efficiency.

In the FIG. 1 example, the Operator Server includes a notification database 3, an Address Book Database 4 and a notification server 5. These three databases (3, 4, 5) may be implemented as a single data source or as three data sources integrated into one or more servers or, in a still further alternative, as separate servers with single aggregating one. These servers/databases house data pertinent to communications from a number of different sources, typically user-defined. As can be seen from the various alternative arrangements, the exact configuration of the server 2 is not an essential component of the invention.

The Operator Server is in communication with a plurality of external communication channel/service provider servers (Server A, B, C), which provide services to the user of the mobile terminal 1. Server A, for instance, may be operated by a Social Networking site, Server B may be operated by an email provider and Server C may be operated by an Instant Messaging provider, such as MSN Messenger™ or Skype™.

Notifications and other communications intended for the user of mobile terminal 1 are directed to the operator server 2. The operator server 2 is provided with all passwords and authentication data for each of the servers A,B,C so that it is able to receive notifications and other communications from the servers on behalf of the user of the mobile terminal.

All notifications from the Service Provider servers may be transmitted to the Operator Server 2. Alternatively, Notification Filter Settings 6 may be applied to the notifications generated by the Service Provider servers, so that only selected notifications are passed onto the Operator Server 2. The notifications may be of any format, including email, SMS, MMS and voicemail.

In this embodiment the terminal 1 is a mobile terminal. It is however to be appreciated that the terminal may be any computing device with network capabilities.

The mobile terminal 1 has an interface through which the user of the terminal 1 communicates with the Operator Server 2. This interface may comprise two parts, a notification user interface and a settings user interface. Alternatively, the two components may be separate interfaces. The notification user interface, for example, may enable the user to select, for each contact in his phone book, the type of service that he wants, the notification type from that service and the frequency with which communications are received. Different notification types may apply for different services.

In addition, to individually configuring contacts, services and notification behaviours, the interface supports multiple selection and customisation. For example, the user is able to select all contacts or multiple contacts and define therefor individual, multiple and/or all instances of services and notifications. In this way the user is also able to customise notifications from services (e.g. customise x services) that are available, from the type and behaviour of notifications (e.g. set these notifications) or from contacts (e.g. from defined people/contacts) or a combination of all three elements.

Details of the user's contacts are stored on the mobile terminal 1 or an associated SIM in a contacts list. To utilise contact information in defining communication filtering parameters, the operator server 2 preferably obtains the contact information from the contacts list of the mobile terminal 1 and/or SIM and stores them in its address book database 4. The contact information may be synchronised between the terminal/SIM and database 4 periodically. The database may simply mirror the device's contact list or can aggregate contact information for a particular user from multiple and disparate sources e.g. Web mail and phone book.

For any of these contacts, the user may define settings that apply to all notifications and other communications that come in from each contact. These settings may set the frequency of notifications (on an overall or per contact-basis), the type of notifications to be received and also the level of information conveyed in each notification (e.g. the sender's name, subject, header, posting etc).

The settings may also be set in regard to the service provider sending the notification. For instance, the user may specify the frequency and type of notifications that they wish to receive from certain service providers. For instance, for the service provider Facebook™, the user may specify that they only want to receive notifications once a day, and then only notifications relating to wall posts by a particular set of friends/contacts and not others.

Figure 5:
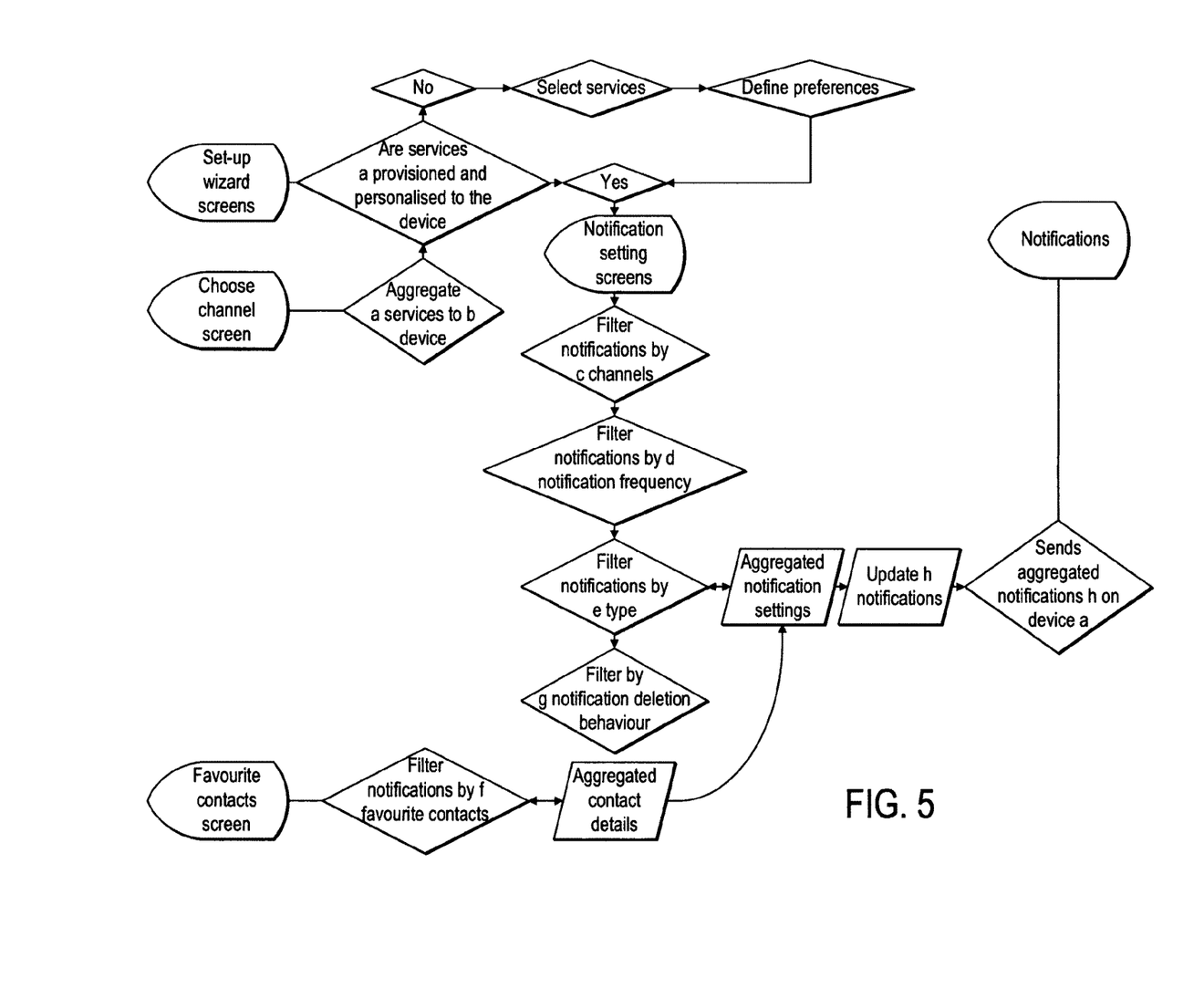
FIG. 5 illustrates a dataflow diagram for setting up control settings according to an embodiment of the invention.

An example of how the channel and notification settings on the terminal can be set up will now be described with reference to FIG. 2. This is preferably achieved using a set-up wizard which defines the desired communication channels, service and products that the user wants aggregated. An example implementation of this is illustrated in FIG. 5.

Data input by the user defines the number and type of channels on the device, links the device to any third party providers and servers, and also links the channel preferences and authentication to a server. The FIG. 5 example shows a process of customisation using a wizard (step 1*a* in FIG. 5). In addition to using a wizard more skilled users may configure the same parameters through directly manipulating settings on the device that are used within the wizard UI, such as through the "choose channel screen" (step 1*b* in FIG. 5) to aggregate service "a" to the device (step 2*b*).

Figure 2:
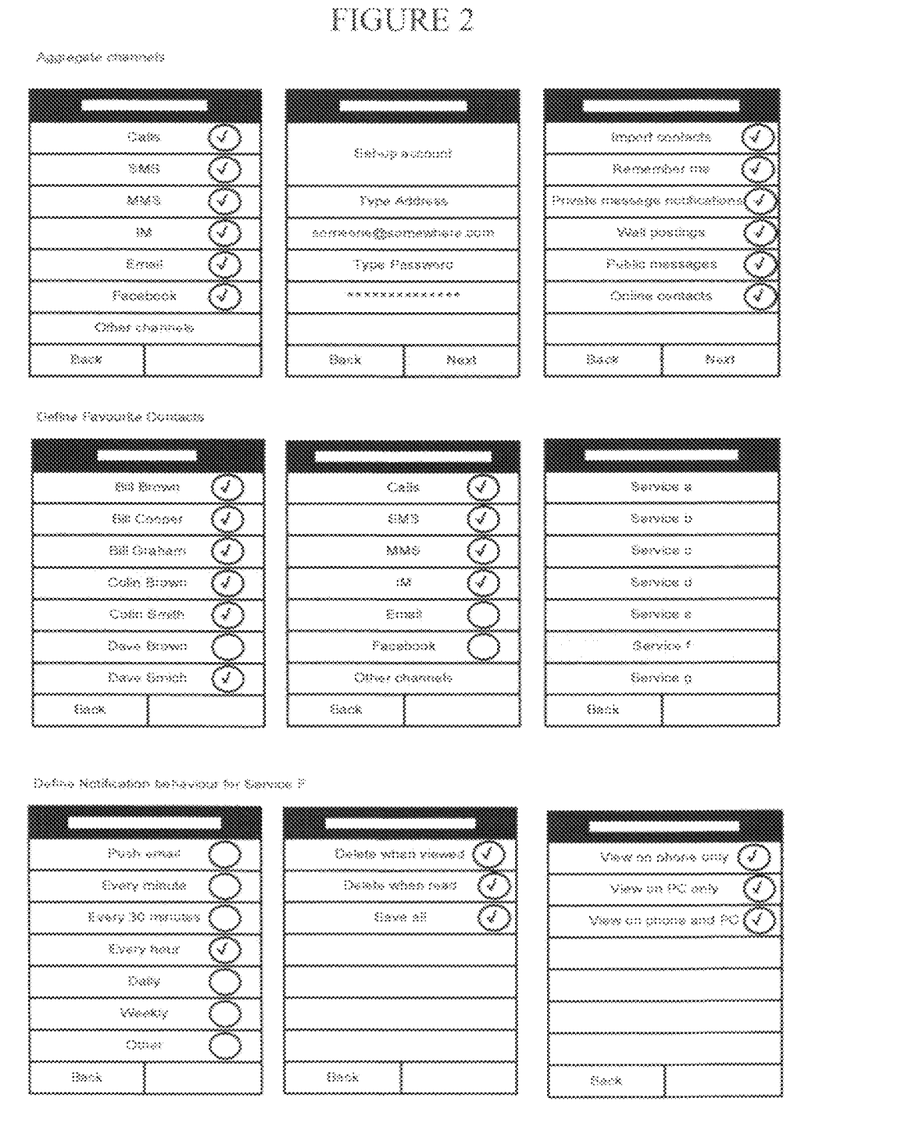
FIG. 2 illustrates terminal screen set-ups showing examples of how to aggregate channels, define favourite contacts and define notification behaviour for a given service.

FIG. 2 illustrates example screen set ups illustrating how difference services/service providers may be provisioned and personalised to the device. In this regard, the first row in FIG. 2 illustrates three sequential example GUI screen shots for aggregating the numerous communication channels. The first example screen set-up illustrates a pre-filled list of communication channels that the user may select for applying the filtering, namely calls, SMS, MMS, IM, Email and Facebook™. Each of these listed channels has an icon which is selectable by a user of the terminal, in order to indicate which of the channels the user wants to aggregate for filtering. This list is dynamic and can be populated over the network.

There is also an entry for "other channels" to take the user to another screen in the event of all the defined channels not fitting onto a single screen. Through this option, the user may designate other channels such as social network sites, or blogs/noticeboards on other websites that are of interest to them and which are not preloaded onto the device. For example, from this access point they may search for a particular service and create an account or provision one to the device. This is better illustrated in relation to FIG. 4, where highlighting the "other channels" option (first screen shot) brings up a menu which enables the user to define new communication channels (second screen shot).

Figure 4:
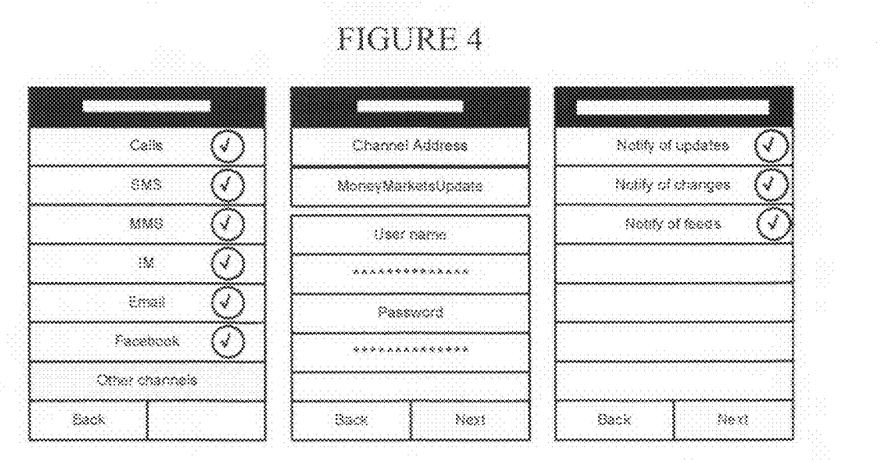
FIG. 4 illustrates example terminal screen set ups showing a sequence of screen that could be used to define a notification channel not already defined.

In the specific FIG. 4 example, the screen aids in defining the new channel by prompting the user to enter the channel address, as well as a username and password used for that channel (i.e. so that the terminal can gain access to the newly defined account). In this example, the new communication source being defined is "MoneyMarketsUpdate". The next menu (i.e. the third screen illustrated) provides various options that may be applied to communications from this new "MoneyMarketsUpdate" account, which in this example includes the options to "notify of updates", "notify of changes" and to "notify of feeds".

Returning to the first screen shot shown in FIG. 2, on this screen the user has defined filtering to occur in relation to all the possible communication channels on this screen, by selecting an icon provided for each option. By highlighting and thereby selecting the Facebook™ tab, a further menu is brought up, which is associated with the Facebook™ communication service. In this regard, the next screen shot shows the account information that the terminal requires in order to gain access to the remote Facebook™ account. The user is prompted to enter their email address used with the account and their password. Going onto the next screen, a number of set up options for Facebook™ are provided for the user to select, which allow a user to specify the type of notification for each channel, and if desired, for each contact. The options given on this screen are to:

"import contacts" to authorise the terminal to import the contacts listed in Facebook™ onto the terminal;

"remember me" to authorise the terminal to save the user's password and/or email address to prevent them having to enter these details each time they access Facebook™;

"private message notifications" to authorise the terminal to receive personal messages from other Facebook™ users;

"wall postings" to authorise the terminal to receive notifications when other Facebook™ users post messages/ information on the user's public message "wall";

public messages" to authorise the terminal to receive personal messages (sent publicly rather than privately) from other Facebook™ users; and "online contacts" to authorise the terminal to receive information regarding which of the user's contacts are currently online (i.e. logged into Facebook™).

These are just examples of the set-up configurations that may be stipulated, and others are of course possible. As the notifications will differ for each channel, this customisation may require the server 2 to collect notification customisation data and present it to the user on the user interface relating to the parameters of that particular service. For example, the notification customisation data may specify "wall" updates, private messages and when IM contacts are online, which are each relevant to one or more specific channels, and not necessarily all channels.

Having defined the channels that the user wishes to use, notification setting screens may then be used by the user to assign contacts to each channel and bar or select them across different channels. This may be achieved by the server aggregating contacts from the various channels including from the databases held on the device and any related storage areas such as SIM cards. The user is able to define notifications for all contacts and also edit and manage them individually so that no two contact notifications may be the same if the user wishes.

As shown in FIG. 5 the notification setting screens may be used to define filtering parameters of the notifications and other communications by:

channel identity, notification frequency requirements, notification type and by notification deletion behaviour e.g. whether deletion occur on the device or server or both server and device or combination of either.

Again referring to FIG. 2, the middle row shows how different contacts in a user's phonebook may be stipulated for receiving service information from. The first screen set up shows a list of contacts, with an icon that the user can select to define that they do wish to receive notifications in regard to that contact. In this example, the user has highlighted "Colin Brown", so as to select this contact, and accordingly bring up another menu associated with this contact (middle screen). This middle screen lists a number of communication options, which the user can select in order to specify the ability to receive such notifications from Colin Brown. For instance, the screen shot shows that the user has elected to receive notifications regarding calls, SMS, MMS and IM from Colin Brown, but not Email or Facebook.

The middle screen shot also includes an entry for "other channels" which when selected brings up a menu with additional channels from which notifications may be received from Colin Brown. In this screen the other channels have just been listed generally as services a to g. These services may, for example, be other social networking sites, or even addition email accounts. The options provided in these second and third screens are available for each of the contacts in the user's address book.

The third screen in the middle row has service "F" highlighted, and upon selection, brings up a menu which allows the user to define notification behaviour for that service (see the first screen in the final row of FIG. 2).

This screen shows different options in relation to the notification frequency and polling of notifications for service F. The options given in this screen are the ability to "push email", as well as various timing options, including "every minute", "every 30 minutes", "every hour", "daily" and "weekly". An "other" option is also given for further options to be defined including user set parameters.

In other words, the options may be used to schedule polling of the plurality of service providers in order to receive any communications intended for the particular user. This polling procedure is preferably performed using a timing schedule for each of the service providers. Alternatively, communications may be pushed to the server 2. In this alternative the communications are typically pushed by each of the server A,B,C as they become available or upon request by the server 2 (and this request may also be subject to a schedule so that the notifications are pulsed at the correct time). The server 2 also preferably includes a buffer or cache in order to hold any communications that are to be provided to the user, particularly if the user has implemented a schedule to receive the communications only at an appropriate time.

In this first screen of the final row in FIG. 2 "every hour" has been highlighted and selected, in order to bring up a subsequent menu, illustrated in the second screen of this third and final row.

This screen shot illustrates notification behaviour that may be applied to the notifications that are to be received by the terminal every hour. The options in this screen define deleting the notifications when viewed/read and also to save them all. This allows the user to define how the notifications are dealt with after they are received.

The final screen in the third row provides some further options that may be applied to the notifications that are received. These options are for the notifications to be:

viewable on the phone only;

viewable on a PC only;

viewable on a phone or PC.

This allows the user to define the ability to view the notifications external to the mobile device. This final screen may be utilised in an embodiment where the user has access to the Operator Server 2 via a plurality of different devices/terminals and accordingly allows the user to define different receiving requirements for each of these devices. For instance, the user may be able to receive the notifications on a mobile terminal and a computing device such as a laptop or a PC. However, the user may not want to receive any Facebook notifications on their phone. Accordingly such notifications can be specified as being viewable on a PC only. Similarly, the user may only want notifications regarding SMS communications to their mobile terminal and not their PC. Further, email communications from certain contacts may be specified as receivable on both a PC and a mobile terminal. In this way, preferences and access to the communications/notifications can be further limited to particular devices, based on attributes such as communication type and/or contact.

Figure 3:
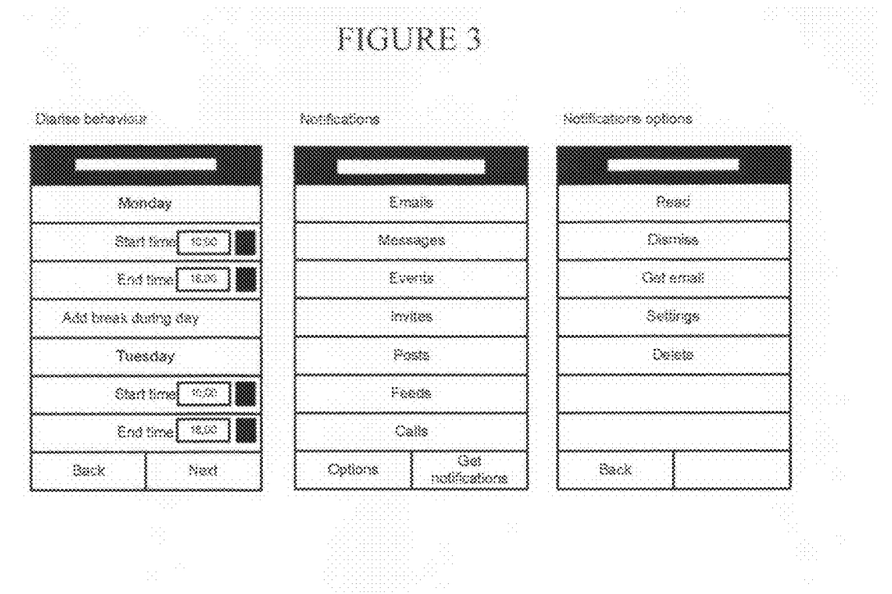
FIG. 3 illustrates example terminal screen set ups showing examples of how to schedule service notifications, the types of notifications and notification options where the notification type is email.

FIG. 3 illustrates further options that may be defined in relation to the notifications. The first screen shot in FIG. 3 illustrates options for diarising the notifications. This screen shows that a start and end time for receiving/checking for notifications for certain week days. In this example Monday and Tuesday are illustrated and notifications have been set to be received between 10 am and 4 pm on each of those days. An option for providing one or more notification breaks in the day is also provided. Other week days may also be individually specified in subsequent menus, or just on a general daily basis.

The second screen in FIG. 3 is an aggregated notification screen and lists the different types of notifications that the terminal is capable of receiving, namely emails, messages, events, invites, posts, feeds and calls. This allows the user to select a subset of notifications to view based upon type. This screen can either be a plug in for the server that uses the data or an integral component that mirrors changes to the database.

The third screen in FIG. 3 provides relevant options for each notification. In the example, an email notification is shown with relevant options for reading the email, dismissing the notification, refreshing the email account etc. Each service and notification will have its own relevant call to action options and so this example is only relevant for email and a wall posting would include different options.

The screen images of FIGS. 2, 3 and 4 essentially illustrate how the end user may customise and control their receipt of notifications which includes notifications relating to particular communications, or even the existence of particular online content. As shown in these Figures, the notification may be controlled and limited by sender, time, type, frequency of update. Also, the notifications may be received from preset channels available on the terminal (such as SMS) or user defined channels (such as a particular message board on a website).

A user interface, typically provided on a mobile terminal or PC, provides the user with the ability to select from whom they wish to receive notifications, what kind of notifications and who to block from an aggregated server based address book. The user interface is able to achieve this by drawing on the user's input, and other data sources, such as the user's contact address book. For example, the list of contacts from whom the user wishes to receive notifications may be obtained from a contact address database associated with the communications device.

The user may also define a default position, for instance being that communications from all sources not defined in the address book are blocked or sent to a dedicated folder, such as a junk folder.

Advantageously these embodiments of the invention are able to operate independently of the plurality of service providers, and yet provide the user with the ability to control delivery of notifications from these service providers. Even more advantageously, this control can be achieved on a contact or friend level, by drawing from the user's contact address book.

The user interface for customising and controlling the communication channels on the terminal may be implemented in hardware and/or software.

Once the communication channel requirements have been defined by the user on the user terminal, this information is transmitted to the Operator Server 2. The Operator Server 2 in turn synchronises with the selected communication channels in order to check that the services have been correctly provisioned, that the relevant accounts are working and that server can support the customisation preferences and settings. If there are errors in the set-up process then the Operator Server 2 will communicate diagnostic information to the user and/or service provider as necessary to fix the problem.

In order to receive the notifications from the different service providers (A,B,C) the operator server 2 communicates with the service providers servers using the authentication data provided by the user to extract the relevant notifications. In essence the user is giving the operator the permission to intervene and aggregate services and the servers used in running the services. It is to be appreciated that whilst the Operator Server 2 is used to provide authentication data (e.g. username and password) to the different servers, this is not an essential feature of this embodiment of the invention. Depending on the service provider, the exact nature of this operation may vary. At the highest level of integration servers communicate and upload data directly and at the lowest level of integration the operator server calls on the service provider to send to the user's device directly notifications as per the behaviour the user has set up. In any case a match is made between the user's preferences, the service provider and the operator upon whom the notification and personalisation settings are sent.

The data pertaining to each of the service providers is collected by the server 2, and parsed using filters as defined by the user. This would be typically performed by notification customisation software that makes inferences on the data available to it. For instance, it would parse the data to determine which channel it relates to and from whom the notification is sent.

After this, the filtering parameters can be invoked on the collected communications. For instance, it would be determined which channels are selected, from whom notifications are allowed, how often notifications are needed and when notifications were last viewed allowing previously viewed notifications to deleted from the list. For example, if the user views notifications at 10.00 am and then at 12.00 pm then only notifications from the two hour period will be shown unless the user has disabled this feature.

The server 2 may then communicate with the user's device in order to deliver the defined notifications and display notifications matching the user's preferences. Notifications will typically appear on an aggregated screen (see FIG. 3, second screen) and include a number of options such as viewing the notification and source content (e.g. full email) and also to pull new notifications from the server (see FIG. 3, third screen).

The user's device is typically able to poll the server 2 to get new notifications and also access settings that define which channels appear on the screen.

The key concept behind this embodiment of the invention relates to the handling of notifications on a particular device, configured to a particular user's preferences. In particular, the filtering of the notifications based upon the sender of the notifications, such as may be defined from a contact address book, is an important feature of the invention.

Further, as some of the communication channels may require users to be online or otherwise "present" in order to receive notifications, the operator server may also be configured to aggregate if and when a contact is communicable. In this case, the device will communicate relevant information on the user's status/presence/availability to the server and this information will then trigger the corresponding behaviour for the services that require the user to be present and/or online.

Defining notification behaviour via the mobile device's interface allows the user to set relevant parameters to that channel, which the server then uses to parse received communications by the frequency of notifications, online status of contacts, level of information conveyed in the notification (e.g. sender's name, subject etc) as well as the type of notification (e.g. website or widget updates, arrival of new message), for instance.

Once the user has configured their notification and channel settings, they are also able to add, edit and replace channels as required.

Since the Operator Server 2 is in direct communication with each of the communication channels, the server 2 effectively acts as a gateway for the user, implementing the user's filtering and aggregation requirements in regard to their communications channels. Alternatively, however, rather than the operator server 2 being directly in communication with each of the service provider servers, the operator server 2 may advantageously may be utilised in conjunction with a separate aggregator. In this embodiment of the invention, the operator server 2 would be configured to control and filter the notifications that issue from the aggregator.

Advantageously by providing the Operator Server 2 with more than one communication source from each contact (i.e. different formats of addresses including email addresses, URLs and telephone numbers), then the server 2 is able to filter out notifications from unwanted and wanted senders from a plurality of different sources.

Therefore, after having defined the channels to be filtered, and the behaviour of notifications the user requires, the user is then able to view them as defined, such as at set intervals, only from specified contacts/sources etc. Preferably these notifications appear on an aggregated screen and include a number of viewing options, such as viewing the notification and source content (e.g. full email address of sender).

Overall it is to be appreciated that according to the embodiments of the invention, a user is able to define how and when they receive notifications and other communications:

a) on a general level (i.e. based upon frequency, timings); and/or b) based on the sender of the communication, which may be a contact, other entity or the service provider (e.g. where a notification is automatically triggered).

The embodiments of the invention that have been described are to be considered as exemplary of the invention, as changes and additions are possible.

For instance, although the embodiments have been described in relation to the database server 2 pushing data to the mobile terminal, the mobile terminal could alternatively pull information. This information may be pulled according to a schedule established on the mobile terminal. More specifically, the filtering preferences specified by the user may be utilised by the server 2 in an active sense. That is, the server 2 may utilise the defined filtering parameters to scour defined data sources for notifications, messages, content updates, feeds and the like. In this way, rather than notifications being pushed from the server 2 to the device, the active filtering actively hunts out data relevant to the user.

Similarly, although the embodiments have been described in relation to the database server filtering communications upon receiving such communications from the service providers, the database server may alternatively be configured to initiate access to a service provider to determine if something has changed in that service provider. For example, the database server could access a "wall" on Facebook™ to determine if any new postings have been made.

Advantageously this arrangement simplifies the applications that the user needs to have loaded on their mobile terminal 1. That is, rather than having a client application for each of the services A, B, C, the terminal only needs one client application to be loaded, namely the notification user interface compatible with the operator server 2.

The user communication device may be a mobile or cellular telephone that communicates wirelessly with the network. The telecommunications network may comprise a mobile or cellular telecommunications network, such as a GSM, UMTS or 4G network. Mobile devices may be any portable electronic communication device that uses a radio network of any kind to link to other users of such devices via a central server even where local connections are made such as WiFi. Mobile devices include, but are not limited to mobile phones and devices using a SIM card or other data storage mechanism. Alternatively, the user communication device may be a PDA, PC or laptop computer.

Products, services and applications to which the present embodiments of the invention apply, may be whole or parts of software applications with a user interface that the user can interact with. Products and services include ones that require a network connection such as interne access or email. In addition, such applications include ones that are pre-installed on the device and also ones that are installed via a network connection and ones that are updated by such network connections including "widgets".

The invention claimed is:

1. In a computer communications network including a plurality of communication channels through which notifications from a plurality of service providers and Internet sources are configured to be transmitted to a plurality of network users, a method of using an operator server to manage the notifications, the method comprising:

receiving at the operator server information of all identified communication channels by which a particular user of the plurality of network users expects to receive the notifications from the plurality of service providers and Internet sources;

receiving at the operator server one or more predefined characteristics relating to a communication type and an identity of a source of notifications that determine notification transmission behavior for the particular user; and controlling provision of the notifications from the plurality of service providers and Internet sources to the particular user by:

at the operator server, registering with the plurality of service providers and Internet sources in order to receive and aggregate the notifications from the plurality of service providers and Internet sources at the operator server, each of the notifications being intended for transmission to the particular user and the notifications being transmitted via the identified communication channels;

the operator server filtering the notifications by determining whether to transmit each of the notifications to the particular user, based upon whether or not each of the notifications satisfies the one or more predefined characteristics relating to the communication type and the identity of the source of each of the notifications; and transmitting the notifications determined for transmission to the particular user when the notifications satisfy the predefined characteristics.

2. The method of claim 1 wherein the determination step includes a comparison of the particular communication channel, service provider and/or network user with a filter list associated with the particular user, the filter list defining acceptable or unacceptable characteristics for each of the plurality of communication channels, service providers and/or other network users.

3. The method of claim 2, further comprising:
defining the filter list for the plurality of other network users using a contact address book of the one or more devices.

4. The method of claim 1 wherein the one or more predefined characteristics include one or more characteristics relating to other users which are defined by the particular user based upon a contacts database associated with the particular user.

5. The method of claim 1 wherein the determination step includes a comparison with a timing schedule for communications to be transmitted to the particular user.

6. The method of claim 1 wherein when a particular communication is determined as allowable, the determination step may further include determining one or more communication devices associated with the particular user to which the particular communication is to be sent.

7. The method of claim 6 wherein the determination step includes comparing a communication type of the received communication to one or allowable communication types included in a filter list for the particular user.

8. The method of claim 1 wherein the determination step includes comparing a communication type of the received communication to one or allowable communication types included in a filter list for the particular user.

9. The method of claim 1, further comprising:
polling the communication network service providers in order to receive any communications intended for the particular user.

10. A network element of a computer configured as an operator server for use in a computer communications network, the network element configured for communication with communications devices and a plurality of communications channels through which notifications from a plurality of service providers and Internet sources are transmitted to a plurality of network users, the network element comprising:
at least one processor and at least non-transitory computer readable medium storing software that, when executed by the at least one processor, performs the following:
receives at the operator server information of all identified communication channels by which a particular user of the plurality of network users expects to receive the notifications from the plurality of service providers and Internet sources;
receives at the operator server one or more predefined characteristics relating to a communication type and an identity of a source of notifications that determine notification transmission behavior for the particular user; and
controls provision of the notifications from the plurality of service providers and Internet services to the particular user by:
registering with the plurality of service providers and Internet sources in order to receive and aggregate the notifications from the plurality of service providers and Internet sources at the operator server, the notifications being intended for receipt by the particular user and being transmitted via the identified communications channels;
filtering the notifications by determining whether to transmit each of the notifications to the particular user based upon whether or not each of the notifications satisfies or not the one or more predefined characteristics relating to the communication type and the identity of the source of each of the notifications; and
transmitting the notifications that are determined for transmission to the particular user when the notifications satisfy the predefined characteristics.

11. The network element of claim 10, wherein the software further:
obtains a contact address database associated with the communication device; and
utilises the contact address database in defining a plurality of other network users in the database component.

12. The network element of claim 11, wherein the software further compares the particular communication channel, service provider and/or network user transmitting the communication with a filter list associated with the particular user, the filter list defining acceptable or unacceptable characteristics for communication sources and each of the plurality of communication channels.

13. The network element of claim 12, wherein the software transmits the communications that satisfy the defined characteristics to the particular user using a timing schedule.

14. The network element of claim 10, wherein the software further compares the particular communication channel, service provider and/or network user transmitting the communication with a filter list associated with the particular user, the filter list defining acceptable or unacceptable characteristics for each of the plurality of communication channels, service providers and/or other network users.

15. The network element of claim 10 wherein the software transmits the communications that satisfy the defined characteristics to the particular user using a timing schedule.

* * * * *